United States Patent [19]

Paulsen

[11] Patent Number: 4,799,329
[45] Date of Patent: Jan. 24, 1989

[54] LURE WITH SKIRT OF PLIABLE FILAMENTS

[76] Inventor: Steven L. Paulsen, 1151 E. 16th St., McMinnville, Oreg. 97128

[21] Appl. No.: 87,329

[22] Filed: Aug. 17, 1987

[51] Int. Cl.$^4$ .............................................. A01K 85/00
[52] U.S. Cl. ................................... 43/42.28; 43/42.25
[58] Field of Search ................ 43/42.25, 42.26, 42.27, 43/42.28, 42.30, 42.31

[56] References Cited

U.S. PATENT DOCUMENTS

| | | | |
|---|---|---|---|
| 2,994,151 | 8/1961 | Webb | 43/42.28 |
| 4,006,551 | 2/1977 | Messacar | 43/42.28 |
| 4,329,804 | 5/1982 | Brown | 43/42.28 |
| 4,468,881 | 9/1984 | Gordon | 43/42.28 |
| 4,638,586 | 1/1987 | Hall | 43/42.28 |
| 4,712,325 | 12/1987 | Smith | 43/42.28 |

Primary Examiner—M. Jordan
Attorney, Agent, or Firm—James D. Givnan, Jr.

[57] ABSTRACT

A fish lure with an elongate pliable body in which a hook is partially embedded with a hook eye receiving a leader end. A head of the lure has an axial opening for passage of the leader. The head defines a circular recess having wall segments perpendicularly disposed to the major axis of the head. A lure skirt is formed of pliable strands secured in place within the head recess with the mid-portions of the strands extending outwardly from the head in radial fashion to provide a skirt of large size with respect to the lure body.

2 Claims, 1 Drawing Sheet

LURE WITH SKIRT OF PLIABLE FILAMENTS

BACKGROUND OF THE INVENTION

The present invention pertains to fishing lures of the type having a skirt comprised of a multitude of flexible filaments or strands in a circular array.

In use in fishing lures are elongate pliable bodies which simulate a worm. A hook is embedded in the pliable body at its pointed and eye ends. A skirt is provided by a multitude of soft rubber strands tied to a "gland" of the simulated worm. Such a lure is disclosed in U.S. Pat. No. 4,468,881. Other lures utilize soft rubber strands to provide a flexible skirt body.

It has been found that the size, shape and action of a skirt during lure movement is critical to the attraction of a fish.

Prior art lures have strands of flexible material which extend outwardly for disposition about a lure body. The strands are of highly flexible material such as soft rubber to move in response to water currents or when drawn through the water. Heretofore skirt attachment has been to a convenient area of the lure body with little or no attention given to the effect on the skirt strands by the shape of the lure body to which the strands are attached. As for example, U.S. Pat. No. 4,468,881 describes skirt attachment as being to the "gland or sex band" of the synthetic worm lure. While the drawing depicts a skirt having a semicircular forward extremity, when moving through water, in actuality such lure skirts do not provide a large diameter skirt relative the main body of the lure.

SUMMARY OF THE PRESENT INVENTION

The present invention is embodied in a lure having a head structure of a configuration to impart the desired shape to a lure skirt.

The present lure includes a pliable elongate body simulating a worm. A hook is embedded at its eye and point ends in the lure body. The eye end of the hook terminates within the forward end of the pliable body whereat it receives the tied trailing end of a leader. The head of the lure is shaped to provide a recess within which are secured skirt filaments or strands. The shape of the recess serves to locate those strand segments, proximate the lure head, in radiating fashion in radial planes substantially normal to the axis of the head to provide a relatively large, highly visible skirt. Such disposition of the lure strands provide a skirt substantially larger than the lure body and one a great deal more effective in attracting fish. To accomplish present skirt shape, an annular groove is formed about the head of the lure which groove may be generally semicircular with the strand segments being held therein by a wrapping of leader or wire metal.

Important objectives of the present invention include the provision of a lure with skirt of pliable filaments or strands which project a substantial distance from the lure body when at rest or when moving through the water; the provision of a lure of pliable construction with a rigid head portion defining a continuous groove thereabout with groove wall surfaces imparting a desired shape to the lure skirt.

DETAILED DESCRIPTION OF THE PREFERRED EMBODIMENTS

Figure 1:
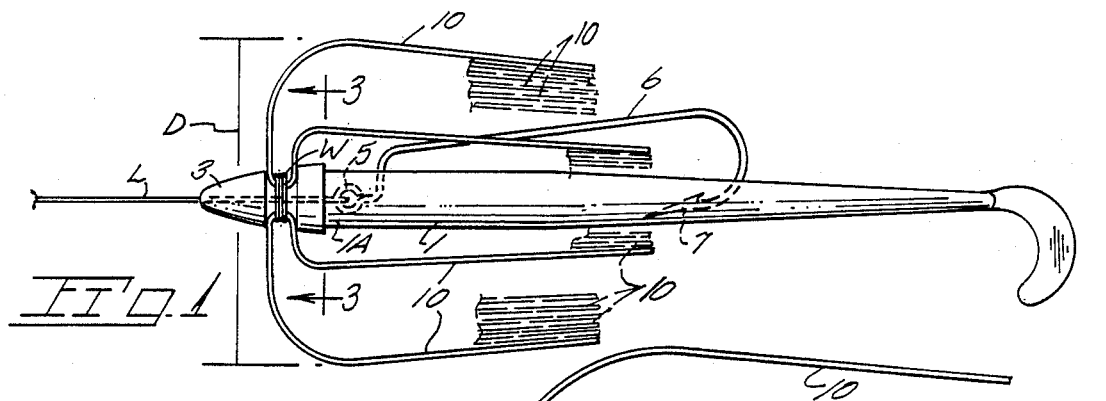
FIG. 1 is a side elevational view of the present lure.

With continuing attention to the drawings wherein applied reference numerals indicate parts similarly hereinafter identified, the reference numeral 1 indicates a main body of the lure which is of elongate shape constructed from resilient material.

Main body 1 may simulate an earthworm and has a forward end segment 1A received within an end recess 2 formed within the trailing end of an elongate head 3 of the lure. The head is elongate and defines an axially located bore 4 through which passes the trailing end segment of a leader L. The leader terminates rearwardly in securement to the eye 5 of a hook 6 having a barb equipped point 7. The point is embedded within the main body of the lure and upon a fish striking the lure projects outwardly of main body 1 for hooking of the fish. Head 3 is metallic to serve as a weight.

Figure 2:
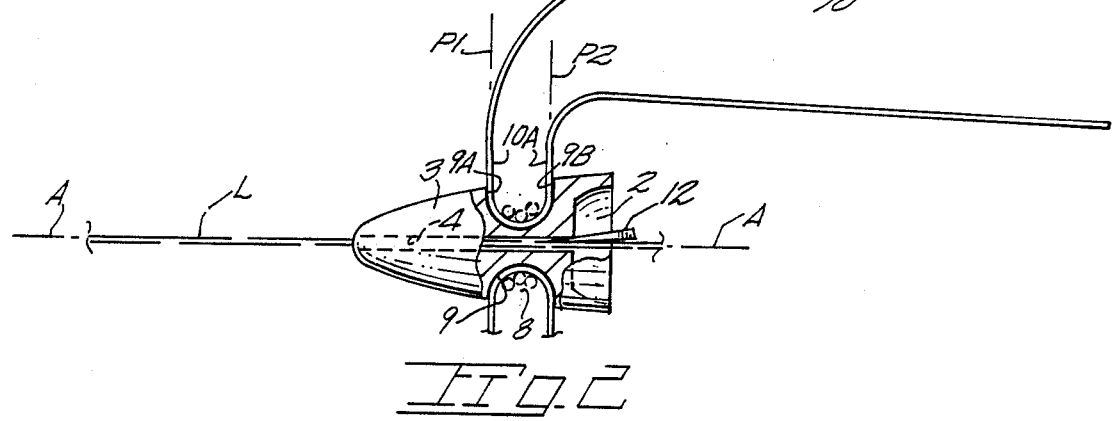
FIG. 2 is a vertical sectional view taken along line 2—2 of FIG. 1 showing details of the head of the lure.
Figure 3:
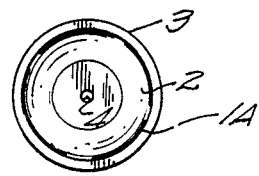
FIG. 3 is a vertical sectional view taken along line 3—3 of FIG. 1.
Figure 4:
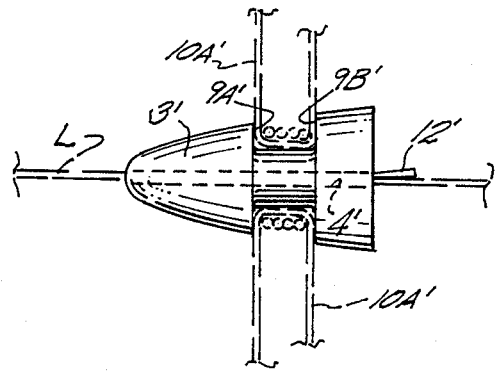
FIG. 4 is a view similar to FIG. 2 but showing a modified form of lure head.

Head 3 of the lure additionally defines a continuous recess or groove 8 to provide a segment of lesser cross section than the remaining oppositely disposed end segments. A groove wall 9, as viewed in section in FIG. 2, is shown to be semicircular. A typical strand 10 of a multitude of strands of the lure has a mid-segment 11 which is confined against groove wall 9 by means of a wrapping at W of leader or the like. The shape of groove wall 9 is such as to have wall segments 9A–9B normal to the major axis A of the head to cause each strand 10 of the lure to initially project radially from the lure head in true radial planes P1 and P2 directing the strands outwardly at right angles relative the major axis A of the lure head. By so shaping groove defining wall 9, the skirt is of much greater diameter at D than the lure body 1 to enhance lure attractiveness. It is understood that groove wall segments could be otherwise shaped as for example parallel planar segments at 9A' and 9B' in a modified head 3' shown in FIG. 4 to accomplish present objectives. The segment of the head receiving the filaments may be cylindrical.

In use, head 3 is secured against slippage on leader L by means of a tapered insert 12 inserted into an axial bore 4 in the head. The strands 10 and their mid-portions 10A radiate from head 3 in planes P1 and P2 to cause the lure skirt to be of large diameter relative lure body 1. The strands, so disposed, move in response to the slightest movement of the lure by the fisherman to greatly enhance lure attractiveness.

While I have shown but a few embodiments of the invention, it will be apparent to those skilled in the art that the invention may be embodied still otherwise without departing from the spirit and scope of the invention.

Having thus described the invention, what is desired to be secured in a Letters patent is:

I claim:

1. A fish lure comprising,
    an elongate pliable body,
    a hook carried by said body and adapted for attachment to a leader,
    an elongate head of metallic material at one end of said body and having a bore lengthwise therethrough and a recess extending about said head, an end recess formed within one end of said head, pliable strands having portions in place in said recess, securement means extending about the strands and confining same in place in said recess whereby said portions of the strands located proximate the head of the lure will project outwardly from the head, and said elongate pliable body including a forward end segment terminating forwardly within said end recess of said head.

2. The lure claimed in claim 1 wherein said recess is partially defined by parallel wall segments disposed substantially normal to the major axis of the head whereby the strands will project in radial fashion from the end.

* * * * *